W. F. NORTON.
VEHICLE BODY.
APPLICATION FILED JUNE 8, 1918.
1,312,422.
Patented Aug. 5, 1919.
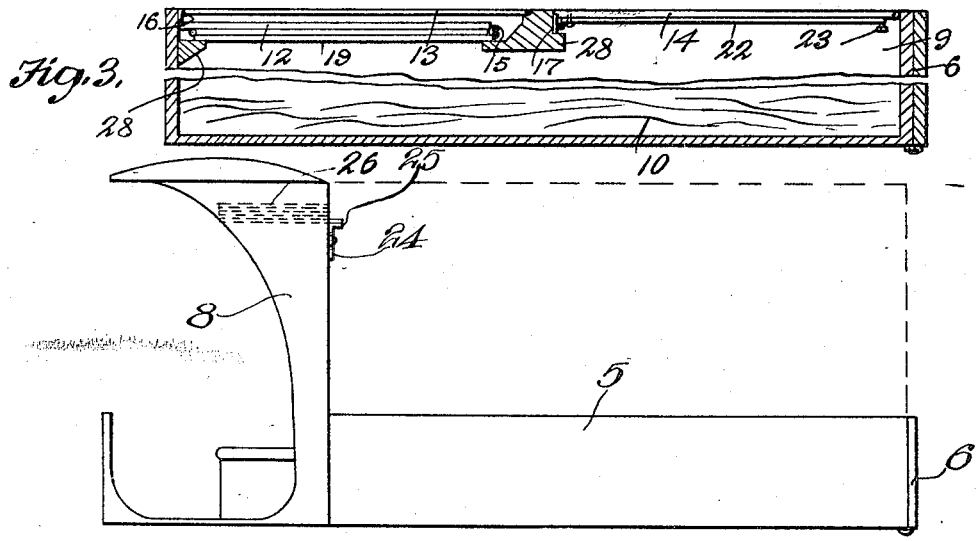
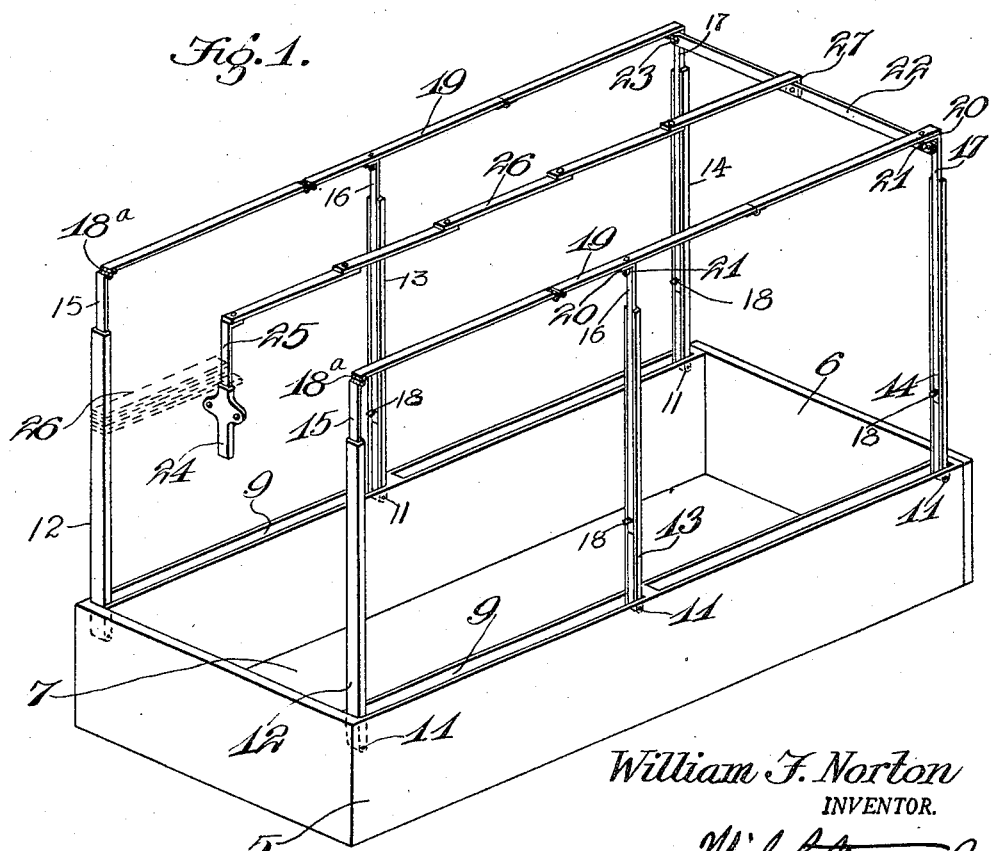
William F. Norton
INVENTOR.
BY
ATTORNEYS.

UNITED STATES PATENT OFFICE.

WILLIAM F. NORTON, OF CHICAGO, ILLINOIS.

VEHICLE-BODY.

1,312,422.     Specification of Letters Patent.     Patented Aug. 5, 1919.

Application filed June 8, 1918. Serial No. 238,878.

*To all whom it may concern:*

Be it known that I, WILLIAM F. NORTON, a citizen of the United States, residing at Chicago, in the county of Cook and State of Illinois, have invented new and useful Improvements in Vehicle-Bodies, of which the following is a specification.

This invention relates to vehicle bodies, and its object is to provide a structure which enables an open body of a wagon or motor vehicle to be converted into a closed body for shelter and to permit high loading.

The object stated is attained by means of a novel combination and arrangement of parts to be hereinafter described and claimed, and in order that the same may be better understood, reference is had to the accompanying drawing forming a part of this specification.

In the drawing,

Figure 1 is an elevation of the vehicle body;

Fig. 2 is a perspective view of the vehicle box converted for use as a closed body structure, and Fig. 3 is an interior or sectional view of the vehicle box, showing a unit of the closed body frame in collapsed position.

Referring specifically to the drawing, 5 denotes the sides, 6 the end gate, 7 the floor, and 8 the cab of an ordinary wagon body of the open type. The sides 5 are made double or hollow in order that pockets 9 may be had at each side of the vehicle, the pockets being designed to hold each a section 10 of the tarpaulin needed for a cover or high top. These pockets are also designed to support in hinged relation, as shown at 11, three channeled bars 12, 13 and 14, these being pivoted at one end to the sides 5 to permit them to be swung to upright position, in which instance the pockets are open for the removal of the cover sections 10. In the channels of the said bars are slidably disposed rods 15, 16 and 17, respectively, which are designed to form extensions of the bars. The sides of the channels are preferably undercut, and the rods fashioned to correspond, so that the latter may not become disengaged from the bars; also, set screws 18 are provided to enable the rods to be fixed at any position to which extended, in relation to the bars.

The channel bars 12 are located immediately behind the cab 8 and to the upper end of each of the extension rods 15 is pivoted at $18^a$ a rearwardly extending beam 19. The latter is made in hinged sections, and of thin material, so as to permit the folding thereof into a small space. The beam 19 overlies the extension rods 16 and 17, and the upper ends of the latter are formed with bends 20 to permit the fastening thereof to the beam 19 by means of screws 21.

To the inner side of one of the extension rods 17, near the upper end thereof, is pivoted a strip 22, which forms a cross bar when swung to horizontal position, extending over to the other extension rod 17, and being secured thereto by means of a screw 23.

On the back of the cab 8, and midway between the bars 12, is secured a vertically slotted fitting 24, in which is slidable a rod 25. This rod is also adapted to be stationed at any desired height, and carries, at its upper end a rearwardly extending beam 26. The latter is formed in several pivotally connected sections, the rearmost section having a bend 27, which is secured to the strip 22 by means of a screw.

The above described parts form a closed-body frame, as shown in Fig. 2, which is adjustable to a height even with the cab, per dotted lines in Fig. 1, or to a greater or lesser height, according to the nature of the load. The tarpaulin covering may be applied to inclose the frame, and fastened to the sides of the vehicle by means of clips, straps, or any other suitable fastening means.

When the closed-body frame is not to be used, the same may be collapsed as follows: The medial beam 26 is first unfastened at the rear and folded in ziz-zag fashion, and then swung when in collapsed form to a position within the cab, beneath the roof thereof, as denoted by fine dotted lines in Figs. 1 and 2—the back of the cab having an opening to permit this movement. Next, the lateral beams 19 are unfastened at the rear and middle to enable them to be folded in coil fashion along the inner faces of the channel bars 12. Now, the rods 15, 16 and 17 are telescoped into their respective channel bars, and the bars 12, each with its collapsed beam 19, swung down into the side pockets 9 of the wagon box, suitable supporting shelves 28 being provided therein. Finally, the bars 13 and 14 are swung down to form closures for the pockets, this action on the part of the bars 13 being facilitated by the low position of the pivots 11 of the bars 12. With the construction refined by one skilled in the art, the bars 13 and 14 may be constructed to close flush with the top of the wagon box, and give the same a smooth appearance.

I claim:

1. The combination with a wagon body; of uprights pivotally carried by the side walls thereof, a cross strip pivotally carried by one of the rear uprights and foldable alongside the same, and extensible across to the other rear upright, a support at the front end of the wagon body located midway between the front uprights, and top longitudinal bars consisting of pivotally connected and foldable sections carried by the front uprights and the said support, the side bars when unfolded extending to the rear uprights, and the medial bar when unfolded extending to the cross strip abovementioned.

2. The combination with a wagon body; of uprights pivotally carried by the side walls thereof, a cross strip pivotally carried by one of the rear uprights and foldable alongside the same, and extensible across to the other rear upright, a support at the front end of the wagon body located midway between the front uprights, top longitudinal bars consisting of pivotally connected and foldable sections carried by the front uprights and the said support, the side bars when unfolded extending to the rear uprights, and the medial bar when unfolded extending to the cross strip abovementioned, and pockets made in the side walls of the body into which the uprights and the cross strip are foldable.

3. The combination with a wagon body; of extensible uprights pivotally carried by the side walls thereof, a cross strip pivotally carried by one of the rear uprights and foldable alongside the same, and extensible across to the other rear upright, a support at the front end of the wagon body located midway between the front uprights, top longitudinal bars consisting of pivotally connected and foldable sections carried by the front uprights and the said support, the side bars when unfolded extending to the rear uprights, and the medial bar when unfolded extending to the cross strip abovementioned, and pockets made in the side walls of the body into which the uprights and the cross strip are foldable.

In testimony whereof I affix my signature.

WILLIAM F. NORTON.

Copies of this patent may be obtained for five cents each, by addressing the "Commissioner of Patents. Washington, D. C."